July 26, 1932.  A. H. MAYNARD  1,868,536
CLUTCH DEVICE FOR WIRE STITCHING AND
STAPLING MACHINES OR LIKE APPARATUS
Filed Sept. 9, 1929  3 Sheets-Sheet 3

Inventor:
Arthur H. Maynard
By
Attorneys.

Patented July 26, 1932

1,868,536

UNITED STATES PATENT OFFICE

ARTHUR H. MAYNARD, OF WARWICK, RHODE ISLAND, ASSIGNOR TO BOSTON WIRE STITCHER COMPANY, OF PORTLAND, MAINE, A CORPORATION OF MAINE

CLUTCH-DEVICE FOR WIRE-STITCHING AND STAPLING MACHINES OR LIKE APPARATUS

Application filed September 9, 1929. Serial No. 391,248.

This invention relates to an improved clutch for connecting the drive of various machines and apparatus. The improved clutch is herein shown and described as applied to use for connecting a motor drive to the operating mechanism of a wire-stitching or stapling machine.

One object of the invention is to provide means for positively clutching a driving-member with a driven-member to transmit power to the machine or apparatus.

Another object of the invention is to provide a clutch having manually-controlled means for connecting and disconnecting the drive to start and stop the operation of the machine at the will of the operator.

Another object of the invention is to provide a clutch of the character specified which is adapted to release the driven-means at a predetermined point to effect the stopping of the machine at the completion of any certain cycle of operations.

Another object of the invention is to provide a clutch of the character specified having its mechanism compacted within a minimum space to adapt it to be self-contained within the driving-means such as gears or the like.

Another object of the invention is to provide a clutch of the character specified having connecting-means for the driving- and driven-members of strong and rugged construction, durable in use and proof against derangement or getting out of order.

Further objects of the improvements are set forth in the following specification which describes a preferred embodiment of the invention by way of example and one method of applying it to use as illustrated by the accompanying drawings. In the drawings.

As before noted, the present improved clutch is adapted for use on various types of machines and apparatus for connecting the drive to continuously or intermittently operate the mechanism of the machine. It is particularly adapted for use where it is required to arrest the operation of the machine at any particular stage in its operation and to re-connect the drive to continue the operations from this point. In power-driven wire-stitching and stapling machines it becomes necessary to stop and start the machine at certain intervals, for instance, where the work is fed to the machine by hand or in other cases to replenish the staples in the machine. With such machines it is desirable that the operation of applying the staple to the work and clinching or bending over its legs be completed and the stapling-mechanism returned to first position before the machine is stopped. The present improved clutch is particularly adapted for controlling the drive to provide for stopping the machine at a certain stage whereby it is placed in condition for the next complete operation.

Figure 1:
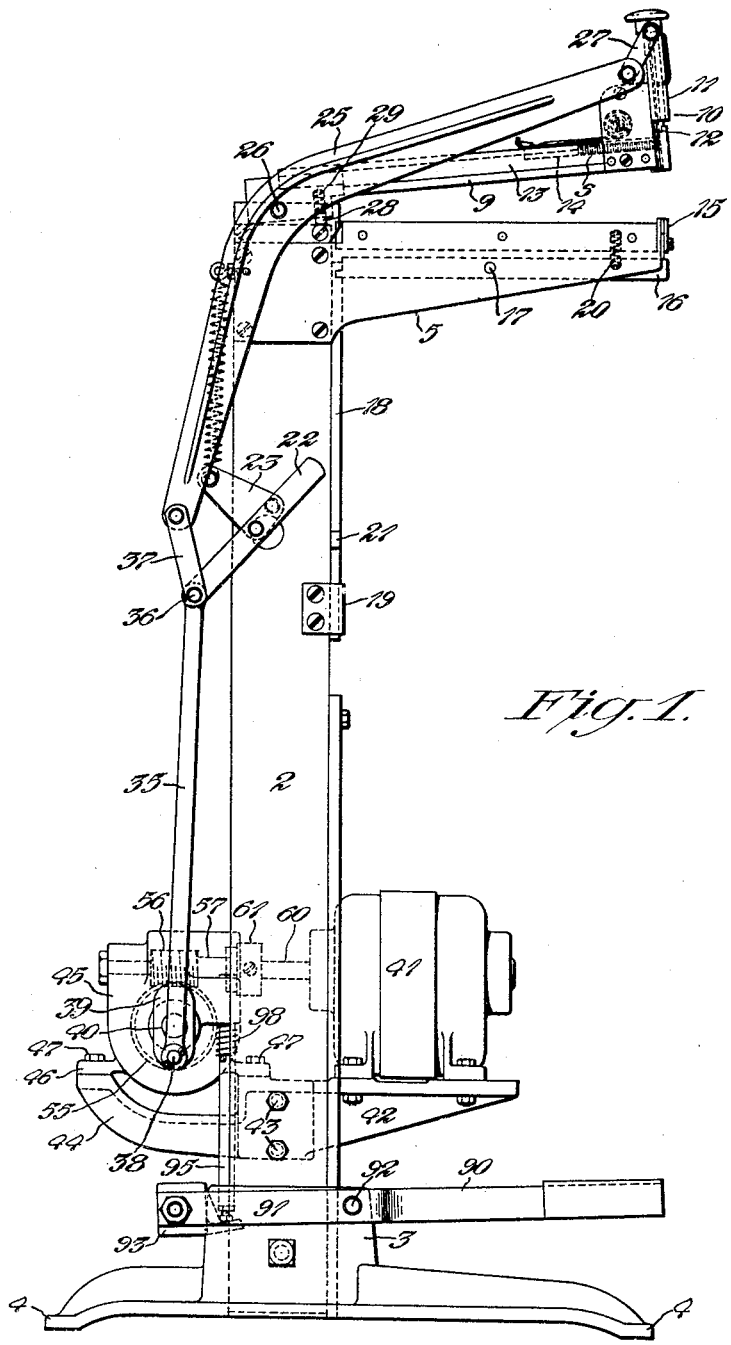
Fig. 1 is a side elevation of a wire-stitching or stapling machine adapted to be operated from a motor drive and showing the present improved clutch as applied to use for connecting the drive under the control of a foot-lever or treadle.

The wire-stitching or stapling machine illustrated by way of example in Fig. 1 of the present drawings is of the same construction and arrangement as that shown in my copending application for U. S. Letters Patent Serial No. 391,247 filed September 9, 1929, which application has matured into Patent No. 1,840,461, granted Jan. 12, 1932. The stapling machine proper is mounted on a column or standard 2 supported from a base 3 having feet 4 resting on the floor. Projecting forwardly from the top of the column 2 is an arm 5 which serves as a work-support for holding the work to be stapled which may consist of sheets of paper to be attached, tags or labels to be affixed to various commodities, or the flaps of cartons and boxes to be fastened together. Pivotally mounted on the top of the standard 2 is a stapling-arm 9 carrying a stapling-head 10 at its forward end which is adapted to be set down against the work held on the arm or support 5. The stapling-mechanism carried on the head 10 comprises, in particular, a slidable plunger 11 which operates a staple-driver 12. The staples s are straddled across the stapling-arm 9 and held in place by overlapping side-plates 13, and a suitable feed-device or pusher 14 feeds the staples forward beneath the driver 12 before the plunger 11 is slid downwardly to drive them through the work.

At the forward end of the arm or work-support 5 is a clincher-device 15, shown and described more in detail in my co-pending application hereinabove referred to, which operates to bend over the legs of the staple after it has been driven through the work. The clincher-device 15 is actuated from a lever 16 pivoted at 17 between the sides of the arm 5. The inner end of the lever 16 is connected to a vertical bar 18 which slides against the forward side of the standard or column 2, being guided in a bearing 19. A spring 20 acts to normally maintain the forward end of the lever 16 depressed with the slide 18 raised, and a pair of lugs 21 on the sides of the slide are adapted to be engaged by the end of a pair of rockable levers 22 to force the slide downwardly. The stitching- or stapling-mechanism is operated from a pair of rocker-arms or levers 25 pivoted on a cross-stud 26 which also serves as a pivot for connecting the stapling-arm 9 to the column 2. The forward ends of the arms or levers 25 are connected to the staple-plunger 11 by means of links 27. A slidable plunger 28 operated from a spring 29 held in a pocket on the under side of the arm 9 tends to maintain the stapling-head 10 raised above the work-support 5. By rocking the levers 25 the stapling-arm 9 is swung downwardly to press the stapling-head 10 against the work, and the continued movement of the rocker-arms will draw the plunger 11 downwardly to drive the staples through the work; it being here noted that the plunger 11 is normally held raised on the head 10 by a suitable spring, not herein shown, which is stronger than the spring 29.

The levers or rocker-arms 25 which operate the staple-driving mechanism and the levers 22 which slide the bar 18 downwardly to actuate the clincher-device are connected to be operated from a reciprocable rod or link 35. The upper end of the rod 35 is pivotally connected at 36 to the end of the pair of levers 22 and also connected to the ends of the rocker-arms or levers 25 by means of links 37. Any suitable means may be employed for reciprocating the rod 35, such as an eccentric, cam or crank. As herein illustrated the lower end of the rod 35 is connected to a crank-pin 38 carried by a crank-disk 39 on the end of a rotatable shaft 40. The shaft 40 is rotated to turn the crank-disk 39 from any suitable source of power such as an electric motor illustrated at 41, and the improved clutch forming the subject-matter of the present application may be employed for clutching and declutching the drive with the crank-shaft.

Figure 2:
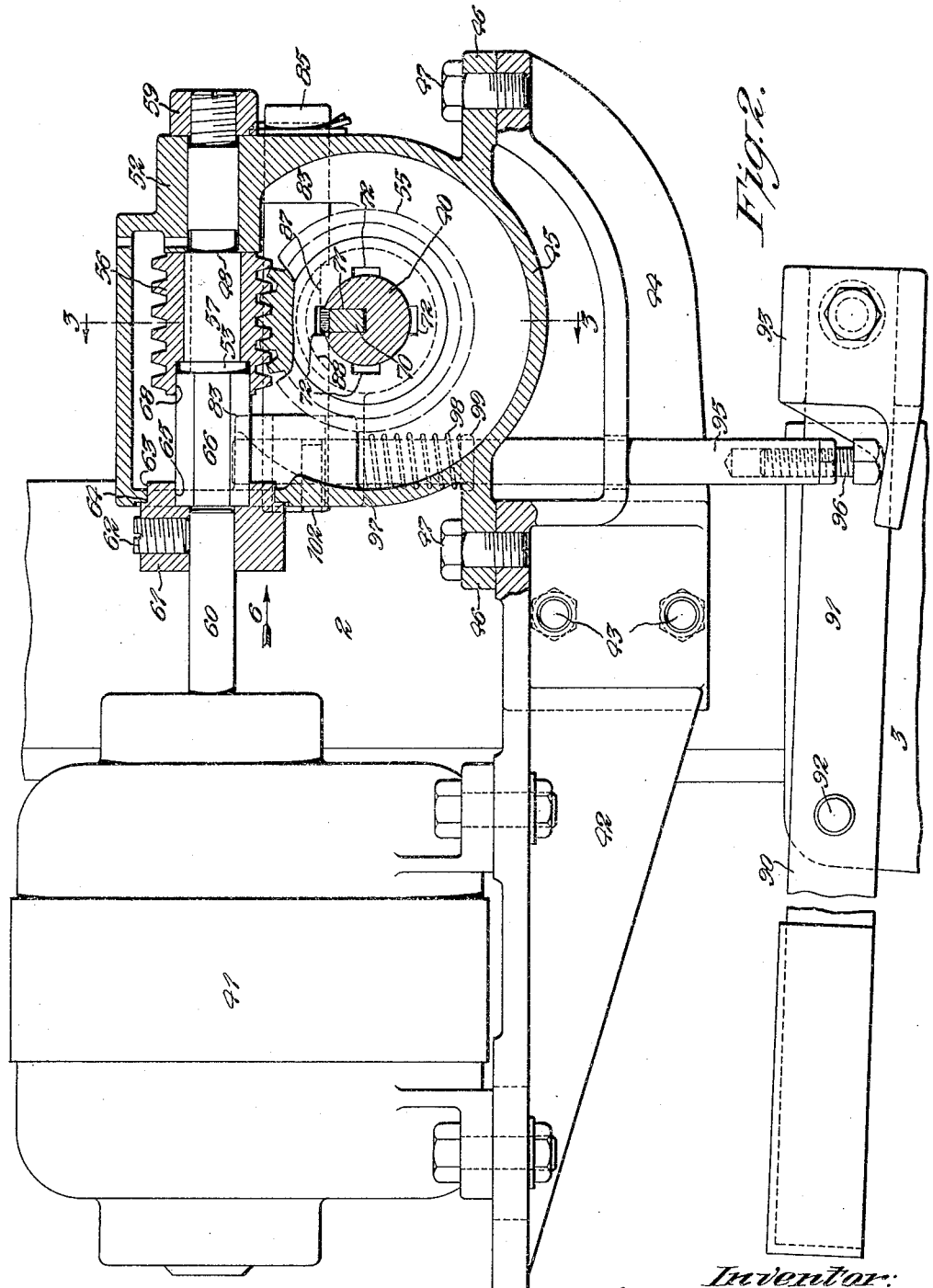
Fig. 2 is an enlarged side view of the driving-connections of the machine shown partly in section.

Referring to Figs. 1 and 2, the motor 41 may be mounted on a shelf or bracket 42 bolted to the side of the column 2 at 43 and having a rearward extension or arm 44 for supporting a housing 45 which encloses the driving-connections. As shown in Fig. 2, the housing 45 is constructed in the form of a cylindrical casing having feet 46 bolted to the bracket 42 and its arm 44 at 47 and provided with suitable end-bearings 48 and 49 for the crank-shaft 40, see Fig. 3. The end-bearing 48 is constructed in the form of a cap or closure bolted to the housing 45 at 54. A set-screw 50 is inserted through the top of the bearing 49 with its projecting end engaging a peripheral groove 51 in the shaft 40 to restrain the latter from axial movement in its bearings. The shaft 40 carries a worm-wheel or gear 55 mounted free to rotate thereon between the bearings 48 and 49 and meshing with a worm or spiral gear 56 which is driven from the motor 41.

As shown more particularly in Fig. 2 of the drawings the worm 56 is journaled on a stud or cross-shaft 57, one end of which is held fast in a hub 52 on the side of the housing 45. The stud 57 has a shoulder 48 abutting the inner end of the hub 52, and a nut 59 screwed onto the opposite threaded end of the stud holds it fixedly in place in the hub. The worm 56 is held from axial movement by the end of the hub 52 and a head 53 on the stud 57. The worm 56 is rotatively connected to the motor shaft 60 by means of a coupling constructed as next described. On the end of the motor shaft 60 is a collar 61 held fast thereto by a set-screw 62. The collar 61 is shouldered at one end to provide a reduced portion 63 which fits within a bore 64 in the side wall of the casing or housing 45 to serve as a journal at this point. The end of the collar 61 is formed with a hexagonal pocket or recess 65 which receives a similarly shaped coupling-member 66 driven thereinto. The opposite end of the coupling-member 66 projects into a hexagonal recess 68 in the end of the worm 56, being slidable therein. Through these connections the motor shaft 60 is coupled to drive the worm 56 and the axial play of the shaft is accommodated by the sliding connection of the coupling-member 66 with the worm.

It has been stated that the worm-wheel or gear 55 is normally free to rotate on the shaft 40 and for convenience of description the gear may be considered the driving-member and the shaft the driven-member of the clutch. The gear 55 is clutched to the shaft 40 through the means of a jack-knife key 70 which is sheathed in a longitudinal slot 71 in the shaft 40 and arranged to be opened or swung radially outward therefrom to engage with a spline or keyway 72 in the bore of the gear 55, see Figs. 3, 4 and 5. As shown in the present drawings, four slots or keyways 72 are provided in the gear 55 to insure that the key 70 will be quickly engaged with the gear when it is released from the slot 71 in the shaft 40. The slot 71 is of suitable width to adapt the key 70 to slide freely therein and the key is held at one end by a pivotal connection arranged as next described.

Figure 3:
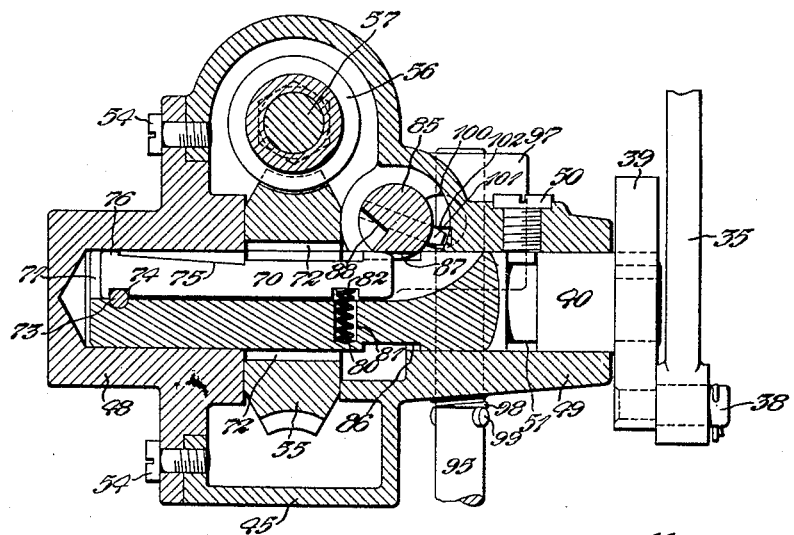
Fig. 3 is a vertical sectional view of the driving-means and clutch taken on line 3—3 of Fig. 2 and showing the clutch released.

Extending transversely of the bottom of the slot 71 is a pin 73 driven through the sides of the shaft 40 and adapted to engage a notch 74 on the bottom edge of the key 70. As shown in Fig. 3, the upper edge of the key 70 is cut away on an incline at 75 forming a projection or lug 76 at its end. The projection or lug 76 on the upper edge of the key 70 engages the side of the bore in the bearing 48 whereby to maintain the notch 74 in its lower edge seated on the cross-pin 73. A helical spring 80 is held in a pocket 81 at the bottom of the slot 71 in the shaft 40 with its upper end engaging a notch 82 on the under side of the key 70 whereby it tends to rock this end of the key upwardly to engage it with the slot or keyway 72 in the gear 55.

From the foregoing it will be understood that the key 70 is urged radially outward from its slot 71 to engage it with one or another of the keyways 72 in the gear 55 to clutch the gear to the shaft; and in accordance with the present invention a novel mechanism is employed for sheathing the key in the slot and releasing it therefrom to control the clutching action at the will of the operator. A manual control of the clutch may be effected through instrumentalities as next described.

Extending through bearings 83 at the sides of the housing 45 is a rock-shaft 85 disposed at right-angles to the axis of the crank-shaft 40, see Fig. 2. The under side of the rock-shaft 85 is let into a groove or channel 86 on the periphery of the crank-shaft 40 and this side of the rock-shaft is flatted off at 87 in line with the outer circumference of the crank-shaft, see Fig. 3. With the rock-shaft 85 turned into the position as shown in this latter view its flatted face 87 will overlie and engage the outer free end of the key 70 when the latter is sheathed in the slot 71 with the shaft 40 at rest. That is to say, when the shaft 40 is at rest with the slot 71 in vertical position above its axis and the rock-shaft 85 turned into position to bring its flat face 87 tangent to the periphery of the shaft 40 the key 70 will be held sheathed in its slot and disengaged from the keyway 72 in the gear 55.

Figure 5:
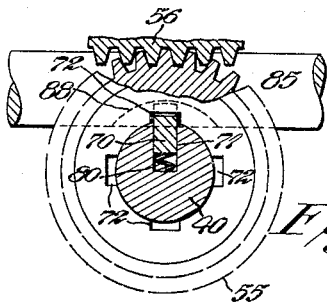
Fig. 5 is a detailed sectional view of the clutch taken on line 5—5 of Fig. 4.
Figure 4:
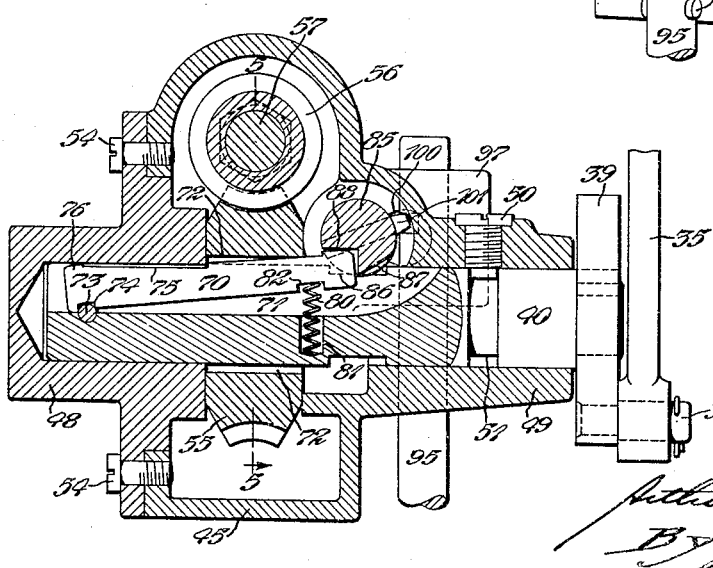
Fig. 4 is a similar sectional view showing the clutch operative to connect the driving-member with the driven-member.

To provide for the release of the key 70 to cause it to be engaged with one of the splines or keyways 72 in the gear 55, the rock-shaft 85 is cut away on its side to form a notch 88, this notch or slot being of arcuate contour on a radius substantially concentric with the axis of the shaft 40, see Figs. 2, 3 and 5. To release the key the rock-shaft 85 is turned into position as illustrated in Fig. 4, with its slot 88 bearing the relation to the shaft 40 as shown by dotted lines in Fig. 5, so that as the gear 55 is clutched to the shaft 40 and rotation imparted to the latter the key will ride through the slot at each turn of the shaft.

The rock-shaft 85 may be operated either automatically or manually to cause it to sheath and release the key 70 to control the clutching action. For manual control the rock-shaft 85 may be formed with a handle at one end, but in the present embodiment of the invention means are provided for rocking the shaft from a foot-lever or treadle 90 pivoted to the base 3 of the wire-stitching or stapling machine illustrated in Fig. 1 of the drawings. The treadle 90 may be of forked construction with its rearward arms 91 straddling the base 3 of the standard 2 and pivoted on a pin or bolt 92. Bolted to one of the arms 91 of the treadle 90 is a stirrup-member 93 adapted to press against the lower end of a plunger-rod 95 to slide the latter upwardly when the forward end of the treadle is depressed by the operator's foot. Preferably, the rod or plunger 95 carries an adjustable set-screw 96 in its lower end whereby the extent of movement imparted to the rod under the action of the treadle may be varied as required.

Figure 6:
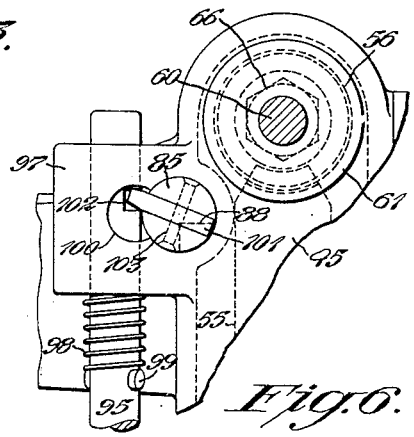
Fig. 6 is an end view of a portion of the clutch-operating means, looking in the direction indicated by the arrow 6 in Fig. 2.

The rod or plunger 95 projects up through a hole in the arm 44 of the bracket 42 with its upper end slidably mounted in a hub or bearing 97 on the side of the housing 45, see Figs. 2 and 6. Coiled around the plunger 95 and bearing against the underside of the hub 97 is a spring 98 which acts against a cross-pin 99 to force the rod downwardly. As shown more particularly in Fig. 6, the side of the hub 97 is bored out at 100 to adapt it to accommodate the end of a flat blade 101 which projects from the side of the rock-shaft 85 and engages a notch 102 in the side of the plunger-rod 95. The blade 101 is inserted through the slotted end of the rock-shaft 85 and held in place by a pin or rivet 103. The projecting end of the blade 101 is chamferred off on its sides in the manner of a gear-tooth to adapt it to turn in the notch 102 as the rock-shaft 85 is rocked from the sliding movement of the plunger 95. It will be understood that the plunger-rod 95 is slid upwardly by the downward movement of the treadle 90 to cause it to turn the rock-shaft 85 to the position shown in Fig. 4 whereby to release the key 70 to effect the clutching-action, the operation of the complete device being as next explained.

The motor 41 may run continuously during the intermittent operation of the wire-stitching or stapling machine or other apparatus on which the clutch is employed, being controlled from a suitable switch not herein shown. With the treadle 90 in raised position, as shown in Fig. 1 of the drawings, the plunger-rod 95 will be depressed under the action of its spring 98 and the clutch inoperative as illustrated in Fig. 3. With the clutch inoperative the crank-shaft 40 remains at rest with the crank-pin 38 at the bottom of its throw and the link or connecting-rod 35 will therefore be drawn down to rock the forward end of the arms or levers 25 upwardly to hold the stapling-arm 9 in raised position above the work-support 5. The levers 22 for operating the clincher-device are also rocked into inoperative position as shown in Fig. 1 and the stitcher or stapling machine is ready to receive the work. The operator places the work across the arm or support 5 and then presses his foot on the treadle 90 to depress the forward end of the latter. The depression of the treadle 90 rocks its rearward arms 91 upwardly and thereby causes the stirrup 93 to slide the plunger 95 upwardly.

Referring now to Fig. 4 of the drawings, as the plunger 95 is slid upwardly the engagement of its notch 102 with the blade 101 on the rock-shaft 85 rocks the latter from the position shown in Fig. 3 to that illustrated in Fig. 4. As the rock-shaft 85 is rocked in a counter-clockwise direction, as viewed in Fig. 3, its flat side 87 will ride off from the end of the key 70 to release the latter. As the key 70 is released its spring 80 forces it upwardly to engage one of the keyways 72 in the gear 55 as the latter turns on the crank-shaft 40; it being understood that the motor shaft 60 is continuously driving the gear 56 through the coupling 66 and that therefore the rotation of the worm-wheel or gear 55 is continuous.

As one of the keyways 72 comes opposite the key 70 and is engaged thereby the gear 55 will be connected to drive the crank-shaft 40, and during the rotation of the latter the end of the key will ride through the arcuate slot 88 in the rock-shaft 85 as indicated in Fig. 5.

The rotation of the shaft 40 and crank-disk 39 causes the link or connecting-rod 35 to be reciprocated, and during its upward movement the rod acts through the link 37 to rock the arms 25 to cause them to swing the stapling-arm 9 down against the work held on the support 5. After the stapling-head 10 has been pressed down against the work the continued movement of the rocker-arms 25 slides the staple-plunger 11 down on the front of the head and the staple-driver 12 acts on the leading staple in the series to drive its legs through the work. While the arms 25 are being rocked from the connecting-rod 35 to drive the staple through the work the levers 22 will be operated to carry their outer ends into position above the lugs 21 on the slide 18. As the arms 25 reach the limit of their movement the rocking action of the levers 22 is continued to slide the slide 18 downwardly to rock the lever 16 which actuates the clincher-device 15. It is explained in my co-pending application before referred to that the toggle action of the links 37 and levers 22 is accommodated by arranging the pivot for the levers to shift its position under the rocking action of a pair of compensating levers 23.

As the levers 22 function to complete the clincher operation to bend over the legs of the staple against the under side of the work the crank-pin 38 crosses center at the upper end of its stroke and starts to descend to draw the connecting-rod 35 downwardly. As the rod 35 moves downwardly it reverses the rocking motion of the arms 25 and levers 22 to return them to first position as shown in Fig. 1 to prepare the machine for another operation. If the work being performed is continuous, that is to say, if one staple after another is to be applied to a certain piece as it is fed across the work-support the operator may hold the treadle 90 depressed, thus repeating the cycle of operations just described. When, however, a new piece of work must be placed in the machine or the work in progress must be so shifted that it requires more time than the interval between the finish of one stapling operation and the raising of the stapling-head 10, the operator releases the treadle 90 to disconnect the drive. As the treadle 90 is released the spring 98 will slide the plunger-rod 95 downwardly to cause it to turn the rock-shaft 85 back to the position illustrated in Fig. 3. As the rock-shaft 85 is turned to this position with its flat side 87 tangent with the periphery of the crank-shaft 40 the turning of the latter shaft will bring the upper edge of the key 70 beneath the face 87 on the rock-shaft. As the end of the key 70 rides under the flat face 87 it will be depressed to withdraw it from the keyway 72 in the gear 55 and the gear will thus be declutched from the shaft 40 to cause the latter to come to rest.

It is to be noted that the crank-shaft 40 will always be brought to rest with the key 70 on top, and thus the motion of the crank-disk 39 will be arrested with the crank-pin 38 at the bottom of its throw. This arrangement provides that the operation of the wire-stitching or stapling machine will invariably be arrested with the stapling-arm 9 raised and the plunger 11 elevated on the head 10. In other words, each stapling operation is completed before the machine is stopped with the parts in relation to allow the work to be shifted in position or removed for the substitution of another piece. The present improved clutch is therefore particularly adapted for use on machines where a certain cycle of operations must be completed and the operating parts brought to rest in definite relation upon the shutting off of the power.

It will be observed that the present invention provides a particularly simple and compact construction of the clutch which adapts it to be contained in a minimum space and housed within the gear casing which protects the running parts. The operation of the clutch is positive and so controlled as to bring the driven-member to rest in predetermined position, and the clutching and declutching action may be controlled manually under slight pressure and with only a short motion of the treadle or foot-lever.

While the clutch device is herein shown and described as embodied in a preferred form of construction and applied to use with a certain type of driving- and driven-element for the particular purpose of controlling the starting and stopping of a wire-stitching or stapling machine, it is to be understood that the invention is not limited in this respect to details of construction or method of application.

I claim:

1. A clutch comprising a rotary driving-member, a rotatable driven-member, a key extending axially of and sheathed in one of said members, said key pivoted to adapt it to be moved radially to engage the other member to effect rotary driving connection between said members, and a rockable element extending across the axis of the driving-member and movable into different positions to operate the key to effect the clutching and declutching action.

2. A clutch comprising a rotary driving-member, a rotatable driven-member, a key extending axially of and pivoted to move radially on one member to adapt it to engage a keyway in the other member to effect driving connection between said members, a spring for urging said key into engagement with the keyway, a rockable control-member extending perpendicularly to the axis of rotation of said members and engaging the key to hold it disengaged from the keyway, and means for rocking said control-member to release the key to adapt it to be moved to effect the clutching action to rotatively connect the members.

3. In a clutch, the combination of a rotating driving-member, a rotatable driven-member, a key extending axially of one of said members and pivoted to adapt it to be moved radially to engage it with a keyway in the other member, a spring for moving the key to engage it with the keyway to effect rotary driving connection between said members, and a rockable element extending across the axis of rotation of said members, and engageable with the key to release it from engagement with the keyway to declutch the two members.

4. In a clutch, the combination of a rotating driving-member, a driven-member adapted to be rotated therefrom, a radially movable key in one of said members, a keyway in the other member adapted to be engaged by said key, means for moving said key to engage it with the keyway to rotatively connect said members, and a rockable element extending across the axis of rotation of said members and provided with an opening through which the key is adapted to pass, said rockable element having a portion shiftable into the path of the key during its rotation with said members to cause it to be moved to release it from the keyway to declutch the two members.

5. In a clutch, the combination of a rotating driving-member, a driven-member adapted to be rotated therefrom, one of said members being formed with a slot and the other member with a keyway, a key radially movable in said slot to engage it with the keyway to clutch the two members rotatively in driving-connection, means for moving the key to engage it with the keyway, and a rock-shaft extending at right-angles to the axis of rotation of said members and rockable to engage the key to withdraw it from the keyway to declutch the two members.

6. In a clutch, the combination of a rotating driving-member, a rotatable driven-member, one of said members formed with a radial slot and the other member with a keyway, a key radially movable in said slot to engage the keyway, a spring for moving the key to engage it with the keyway, and a rockable element extending perpendicularly to the axis of rotation of said members and provided with an opening through which the key passes, said rockable element movable in one direction to engage the key to release it from the keyway and movable in the opposite direction to release the key to allow it to be engaged with the keyway.

7. In a clutch, the combination of a rotating driving-member, a driven-member adapted to be rotated therefrom, one of said members being provided with a radial slot and the other member with a keyway extending axially thereof, a key pivoted in said slot and radially movable to engage it with the keyway to connect said members rotatively, a spring for moving said key to engage it with the keyway, and a rockable element extending across the axis of rotation of said members to adopt it to engage the key to withdraw it from the keyway, said element provided with an opening shiftable into position by the rocking of said element to effect release of the key to allow it to engage the keyway.

8. In a clutch, the combination of a rotating driving-member, a driven-member adapted to be rotated therefrom, one of said members being provided with a keyway, a key sheathed in the other member and adapted to be moved radially to engage the keyway in the first member to rotatively connect said members, a spring for moving the key into engagement with the keyway, and a rockable element extending across the axis of rotation of said members and provided with an opening through which the key passes when it is engaged with the keyway, said rockable element being shiftable to engage the key to withdraw it from the keyway.

9. In a clutch, the combination of a rotating driving-member, a driven-member adapted to be rotated therefrom, one of said members being provided with a keyway, a key radially movable in the other member to engage it with the keyway, a spring for moving the key into engagement with the keyway to rotatively connect said members, a rock-shaft extending across the axis of rotation of said members and provided with an opening through which the key passes when engaged with the keyway, and means for rocking said shaft to cause it to engage the key to withdraw it from the keyway.

10. In a clutch, the combination of a shaft formed with a longitudinal slot, a key pivoted in said slot, a wheel rotatable on the shaft and provided with a keyway extending axially thereof, means for moving the key radially of the axis of the shaft to engage it with the keyway in the wheel to rotatively connect the latter with the shaft, and a manually-operable rockable element extending at right-angles to the axis of rotation of said members and having a portion adapted to be moved into the path of the key as it revolves with the shaft to withdraw it from the keyway in the wheel.

11. In a clutch, the combination of a rotatable shaft provided with a longitudinal slot, a key pivoted in said slot to adapt it to swing radially of the axis of the shaft, a wheel rotatable on the shaft and provided with a keyway, a spring for urging the key radially outward to engage it with the keyway in the wheel, a rock-shaft extending across the axis of the shaft and provided with an opening through which the key passes as it revolves with the shaft, and means to move the rock-shaft to cause it to engage the key to withdraw it from the keyway.

12. In a clutch, the combination of a rotatable shaft provided with a longitudinal slot, a key pivoted in said slot to adapt it to swing radially of the axis of the shaft, a wheel rotatable on the shaft and provided with a keyway, a spring in the slot acting against the key to swing it into engagement with the keyway in the wheel, a rock-shaft extending across the axis of the shaft and formed with an arcuate opening through which the end of the key travels as it revolves with the shaft and having a flat portion normally tangent with the periphery of the shaft, and means to operate the rock-shaft to bring its flat portion into position to engage the end of the key to withdraw it from the keyway in the wheel.

13. In a clutch, the combination of a rotatable shaft provided with a longitudinal slot, a key pivoted in said slot to adapt it to swing radially of the axis of the shaft, a wheel rotatable on the shaft and provided with a keyway, a spring in the slot acting against the key to swing it into engagement with the keyway in the wheel, a rock-shaft extending perpendicular to the axis of the shaft and provided with means for engaging the key to depress it into the slot in the shaft, a plunger, and means connecting the plunger to rock the rock-shaft in the manner and for the purpose substantially as described.

In testimony whereof I hereunto affix my signature.

ARTHUR H. MAYNARD.